H. F. JOEL.
SECONDARY BATTERY.
APPLICATION FILED APR. 13, 1908.

931,929.

Patented Aug. 24, 1909
2 SHEETS—SHEET 1

H. F. JOEL.
SECONDARY BATTERY.
APPLICATION FILED APR. 13, 1908.

931,929.

Patented Aug. 24, 1909.
2 SHEETS—SHEET 2.

Witnesses:

Inventor
Henry Francis Joel.
his Attorneys

UNITED STATES PATENT OFFICE.

HENRY FRANCIS JOEL, OF FOREST GATE, ENGLAND.

SECONDARY BATTERY.

931,929.   Specification of Letters Patent.   Patented Aug. 24, 1909.

Application filed April 13, 1908. Serial No. 426,806.

*To all whom it may concern:*

Be it known that I, HENRY FRANCIS JOEL, a subject of the King of Great Britain, residing at Forest Gate, Essex, in England, have invented certain new and useful Improvements in Secondary Batteries; and I do hereby declare the following to be a full, clear, and exact description of the invention, such as will enable others skilled in the art to which it appertains to make and use the same.

This invention relates to improvements in secondary batteries in which a positive and a negative electrode are immersed in an electrolyte; and the objects of my improvements are, first to improve the circulation of the electrolyte; second to provide room for the expansion of the electrodes; and third to provide for the easy escape of the gases evolved so as to keep the surfaces of the electrodes clear of them.

Figure 1:
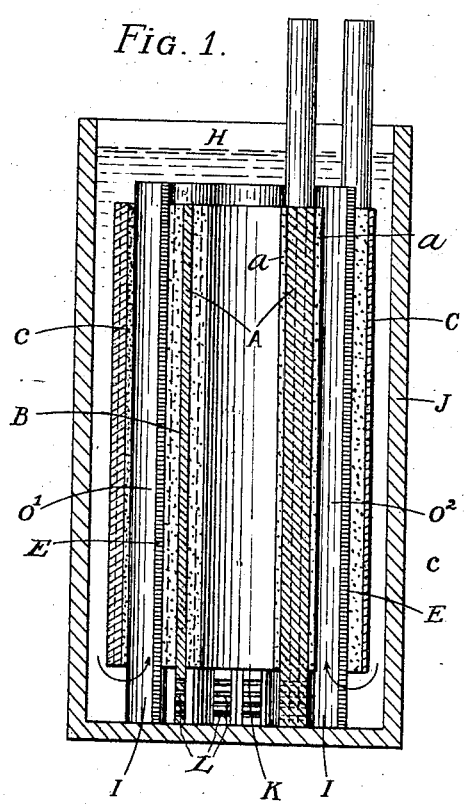
Figure 3:
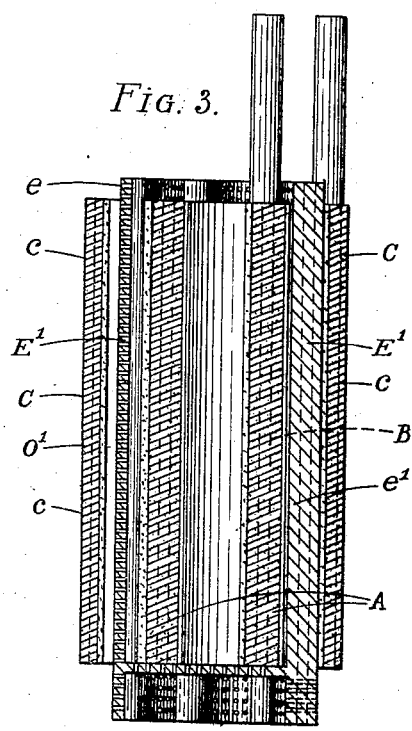
Figure 2:
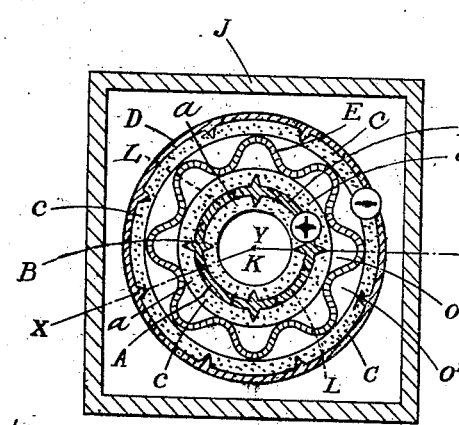
Figure 4:
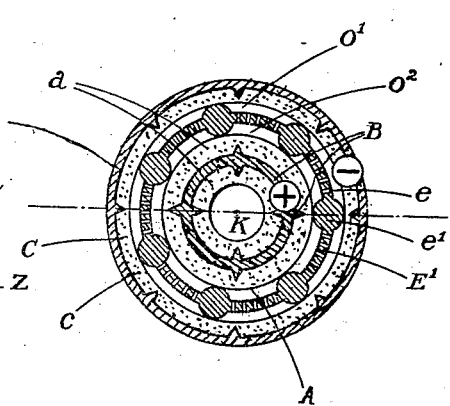
Figure 5:
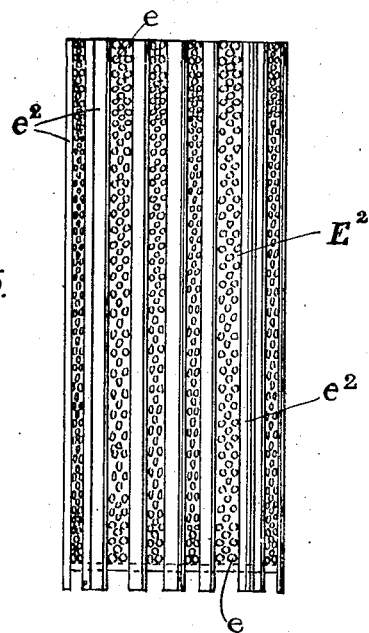
Figure 6:
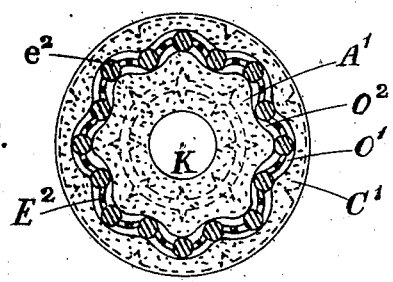

In the accompanying drawings:—Figure 1, is a vertical section of a battery cell of the pasted or Faure type on the line X Y Z of Fig. 2; Fig. 2, is a plan view in section of the cell shown in Fig. 1; Fig. 3, is a vertical section of a cell with a modified form of separating cylinder; Fig. 4, is a plan view in section of the cell shown in Fig. 3; Fig. 5, shows another modification of the separating cylinder; and Fig. 6, shows in plan view the separator in a cell.

Referring to Figs. 1 and 2, A is the cylindrical positive electrode formed by pasting active material $a$ on the inside and outside of the metallic grid B. Preferably the electrode is made hollow so that the central hole K affords an additional passage for the circulation of the electrolyte, and to give access to this central hole the bottom end of the grid is provided with openings L through which the liquid can pass. The negative electrode C is also formed by pasting active material $c$ on a cylindrical grid D and between the electrodes a porous corrugated septum E is interposed which allows the liquid electrolyte to pass through it; the projecting ridges of the septum E act as distance pieces to keep the electrodes A and C the desired distance apart, and also divide the space into a series of vertical channels $O^1$ and $O^2$ the purpose of which is to allow of the easy escape of the gases evolved at the surfaces of the active material $a$ and $c$ owing to the decomposition of the electrolyte by the electric current. H represents the level of the electrolyte contained in the cell J. The gas in rising induces an upward flow in the electrolyte from the bottom of the cell at I where the liquid is usually most dense through the channels $O^1$, $O^2$, to the upper part of the cell where the electrolyte is less dense, and thus it (the gas) assists in setting up an auxiliary automatic circulation tending to equalize the electrolyte throughout the cell with advantage to the efficiency and output. The separator cylinder may be either open or closed at its bottom end.

Figs. 3 and 4 show a similar cell as regards the electrode but the separator $E^1$ in this case is formed of a cylinder of ebonite or other insulating material and to allow of the passage of the electrolyte through it a large number of small holes $e$ are formed over its surface; the vertical channels $O^1$, $O^2$, are formed by making a series of ridges $e^1$ on the inside and outside surfaces of the cylinder $E^1$ and these also act as distance pieces to secure the electrodes the right distance apart. The action of the channels $O^1$, $O^2$, is the same as before; they form an easy passage for the circulation of the electrolyte and provide room for the expansion of the active material.

It should be understood that either form of separator described may be perforated, or either may be of porous material, without detriment to their action it being simply a matter of convenience.

Figs. 5 and 6 show a separator $E^2$ composed of ebonite, celluloid, or the like, having ridges $e^2$ projecting on each side and perforated sections $e$ between. This separator is corrugated in form in order to fit into a cell in which cylindrical corrugated electrodes $A^1$, $C^1$, are used, the vertical channels $O^1$, $O^2$, being still obtained between the ridges of the separator.

I have referred herein to the ridges as being continuous but it must be understood that this is not necessarily so; they may be broken up into a series of projections, or even points, without any great detriment to the action of the cell. Further though described herein in reference to a pasted or Faure type of cell it should be understood that the invention is equally applicable to a cell formed with electrodes of the Planté type by the electrolytic action of a current.

What I claim as my invention and desire to secure by Letters Patent is:—

1. In a secondary battery and in combination, a cylindrical positive electrode, a cylindrical negative electrode disposed concentrically around the positive electrode with a space between them and with a space between its outer surface and the cell casing, the electrodes being so disposed in the cell as to leave space for fluid above and below said electrodes, a cylindrical separator interposed between the electrodes, and vertical ridges on the inside and outside surfaces of the separator so that free vertical channels are formed between it and the electrodes which directly connect the open spaces at the top and bottom of the cell, substantially as described.

2. In a secondary battery and in combination, a cylindrical positive electrode, a cylindrical negative electrode disposed concentrically around the positive electrode with a space between them and with a space between its outer surface and the cell casing, a cylindrical separator interposed between the electrodes, vertical projecting ridges on the inside and outside surfaces of the separator so that free vertical channels are formed between it and the electrodes on either side, and means for supporting the electrodes so as to leave a free passage for the electrolyte at the bottom of the cell from the spaces adjoining the inactive surfaces of the electrodes to the channels between the active surfaces, substantially as described.

3. In a secondary battery and in combination, a cylindrical positive electrode, a cylindrical negative electrode disposed concentrically around the positive electrode with a space between them and with a space between its outer surface and the cell casing, a cylindrical separator interposed between the electrodes, vertical projecting ridges on the inside and outside surfaces of the separator so that free vertical channels are formed between it and the electrodes on either side, a bottom in the said separator for supporting the positive electrode located a short distance from the lower end of the separator and having perforations therein leading into the channels formed between the separator and electrodes and perforations in the wall of the separator below the bottom, whereby a direct passage is formed through which the current of electrolyte descending past the inactive surfaces of the electrodes may force the dense electrolyte at the base of the cell into the channels between the active surfaces, substantially as described.

4. In a secondary battery and in combination, a cylindrical positive grid, a cylindrical negative grid disposed concentrically around the positive grid leaving a space between them, active material pasted on the adjacent faces, a cylindrical separator interposed between the electrodes, vertical projecting ridges on the inside and outside surfaces of the separator so that vertical channels are formed between it and the electrodes on either side, a bottom in said separator for supporting the positive electrode located a short distance from the lower end of the separator and having perforations therein leading into the channels formed between the separator and electrodes and perforations in the wall of the separator below the bottom; whereby a direct passage for the dense electrolyte at the base of the cell into the channels is had, substantially as described.

In testimony whereof, I affix my signature, in presence of two witnesses.

HENRY FRANCIS JOEL.

Witnesses:
H. D. JAMESON,
R. J. WILLIAMS.